(No Model.)
E. B. WILLIAMS.
COTTON BALE BAND CUTTER.
No. 508,156. Patented Nov. 7, 1893.
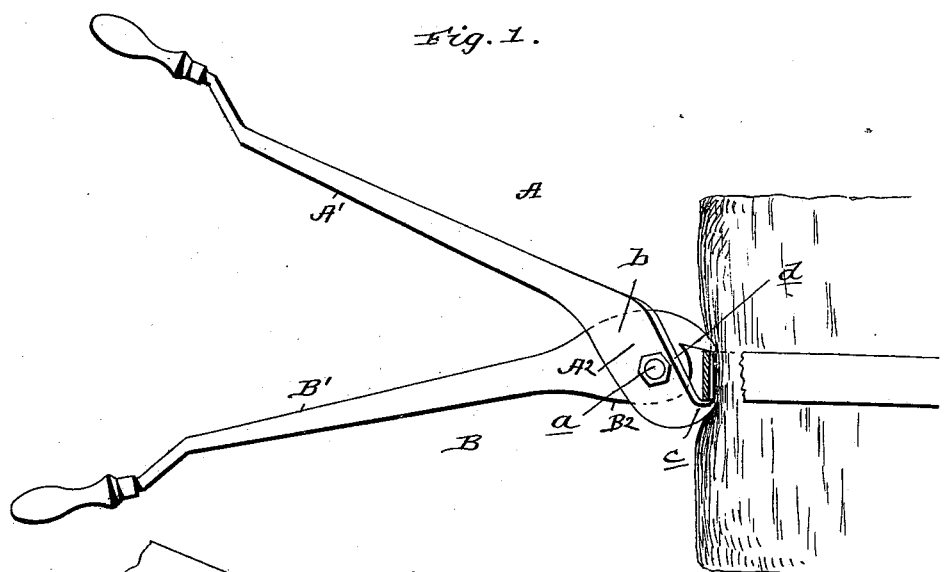
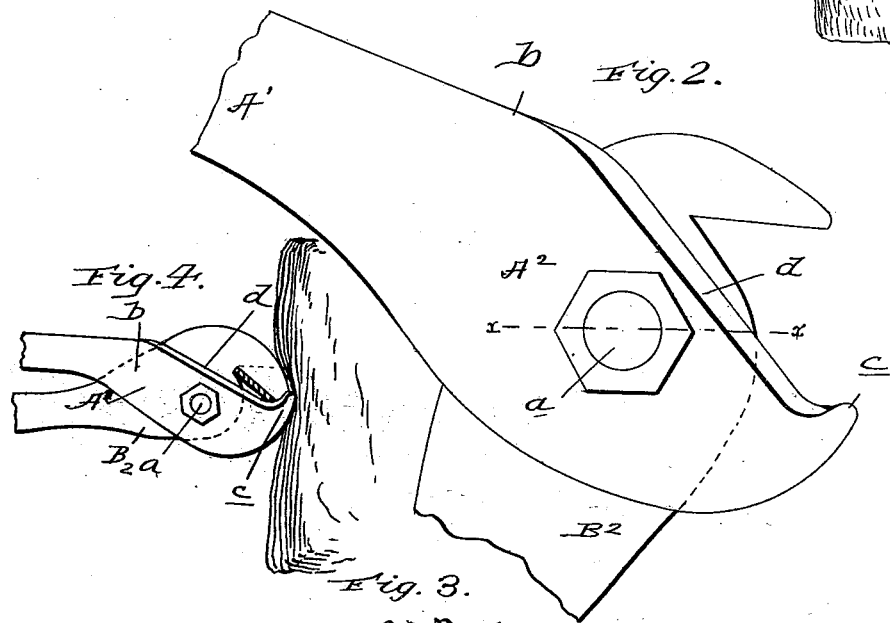
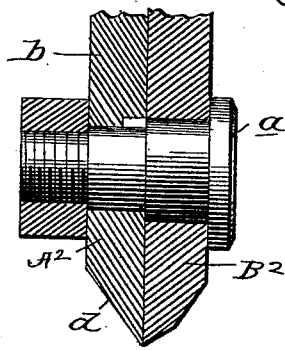
Witnesses:
Inventor
Eben B. Williams
By James J. Sheehy
Attorney

UNITED STATES PATENT OFFICE.

EBEN B. WILLIAMS, OF THORNDIKE, MASSACHUSETTS, ASSIGNOR TO JOHN H. HIGGINS, OF WOONSOCKET, RHODE ISLAND.

COTTON-BALE-BAND CUTTER.

SPECIFICATION forming part of Letters Patent No. 508,156, dated November 7, 1893.

Application filed March 27, 1893. Serial No. 467,834. (No model.)

*To all whom it may concern:*

Be it known that I, EBEN B. WILLIAMS, a citizen of the United States, residing at Thorndike, in the county of Hampden and State of Massachusetts, have invented certain new and useful Improvements in Cotton-Bale-Band Cutters; and I do declare the following to be a full, clear, and exact description of the invention, such as will enable others skilled in the art to which it appertains to make and use the same.

My invention relates to improvements in cotton bale band cutters, and its novelty will be fully understood from the following description and claim when taken in connection with the accompanying drawings, in which—

Figure 1, is a perspective view illustrating the manner of using my improved cutter. Fig. 2, is an enlarged side elevation of the forward portion of the same with the jaws apart. Fig. 3, is a transverse section taken in the plane indicated by the line $x$, $x$, of Fig. 2, and Fig. 4, is a view illustrating the position of the jaws with respect to the band, immediately before the cutting action takes place.

Referring by letter to said drawings: A, and B, indicate the members of my improved cutter. These members are pivotally connected together by a bolt $a$, as better shown in Fig. 3 and they are provided with handles A′, B′, the outer ends of which are offset as shown at $b$, whereby it will be seen that they may be conveniently brought together for a purpose presently described.

The forward portion of the member A, of the cutter is increased in width as shown, to form the jaw $A^2$, which is disposed at an angle to the handle A′, to facilitate the cutting of the band. This jaw $A^2$, has its inner edge beveled as shown at $d$, to form a cutting edge and it is provided at its free end upon its inner edge with a hook $c$, which is designed to engage the edge of a band as shown in Fig. 1, for a purpose presently described. The forward portion of the member B, is also of an increased width as illustrated, and it is provided with a jaw $B^2$, which is designed to take beneath a band and form a cutting base. This jaw has its inner edge straight and blunt as shown, but its outer edge is curved or beveled whereby it will be seen that it will readily take beneath a band without injuring the cotton and will hold the band away from the cotton so as to prevent injury of the same when the band is cut.

In the practice of my invention the jaws $A^2$ and $B^2$, are placed in engagement with a band as shown in Fig. 1, the straight edge of the jaw $B^2$, engaging one edge of the band, and the hook $c$, of the other jaw, the other edge of the band. The handles are then brought together when the hook $c$, will serve as a fulcrum and the jaw $B^2$, by reason of its outer edge being curved and its inner edge being straight and blunt, will take beneath the band and will hold the same away from the cotton as shown in Fig. 4 before the cutting action takes place. Thus it will be seen that the jaw $B^2$, will afford a bearing for the band and said band may be cut without curling or bending the same and without cutting or damaging the cotton, which is an important advantage.

I am well aware that it is old as shown in the patent of one Allen, No. 287,212, to provide a band cutter embodying pivoted blades having beveled cutting edges, one of said blades being provided with a downwardly projecting hook-like point to take and rest against one edge of the band and the other having a tapering point designed to pass under the opposite edge of the band.

I am also aware that it is old as shown in the patent of one Doolittle, No. 256,301, to provide a band cutter embodying pivoted blades having beveled cutting edges, one of said blades being disposed at an acute angle with respect to its handle so that it may be drawn beneath the band before the cutting action takes place, and I therefore make no claim to such construction; but

What I claim, and desire to secure by Letters Patent, is—

In a cotton bale band cutter, as described, the combination of the member A, comprising a handle and the jaw $A^2$, disposed at an angle to the handle and having the cutting edge $d$, and the hook $c$, upon its inner edge at its free end; said hook being adapted to take and rest against one edge of the band, the member B, comprising a handle and the pointed jaw B², having its inner edge straight and blunt and its outer edge beveled or curved whereby it may be forced beneath the band without cutting the same and without damaging the cotton, and a bolt pivotally connecting the members together, substantially as and for the purpose set forth.

In testimony whereof I affix my signature in presence of two witnesses.

EBEN B. WILLIAMS.

Witnesses:
M. M. THOMAS,
MALCOLM McKENZIE.